No. 712,196. Patented Oct. 28, 1902.
W. J. & G. LANE.
MOTOR VEHICLE.
(Application filed Mar. 8, 1902.)
(No Model.)

WITNESSES:
J. E. Pearson
C. E. Stecher

INVENTORS:
W. J. Lane
George Lane
BY
Geo. H. Benjamin
ATTORNEY

THE NORRIS PETERS CO., PHOTO-LITHO., WASHINGTON, D. C.

UNITED STATES PATENT OFFICE.

WILLIAM JAMES LANE AND GEORGE LANE, OF POUGHKEEPSIE, NEW YORK.

MOTOR-VEHICLE.

SPECIFICATION forming part of Letters Patent No. 712,196, dated October 28, 1902.

Application filed March 8, 1902. Serial No. 97,355. (No model.)

*To all whom it may concern:*

Be it known that we, WILLIAM JAMES LANE and GEORGE LANE, citizens of the United States, residing at Poughkeepsie, county of Dutchess, State of New York, have invented certain new and useful Improvements in Motor-Vehicles, of which the following is a specification.

Our invention relates to the means employed for taking up any slack in the power-transmission chain introduced between the power-motor and one axle of the vehicle.

The object of our invention is to provide a means for taking up the slack in the power-transmission chain without the necessity of altering the position or the angular inclination of the power-motor relative to the vehicle-body by which it is supported, and, further we are enabled to do away with the flexible piping which we have heretofore used between the source of power and the power-motor and which in practice has been found to be a source of trouble.

The accompanying drawings will serve to illustrate our invention.

Figure 1:
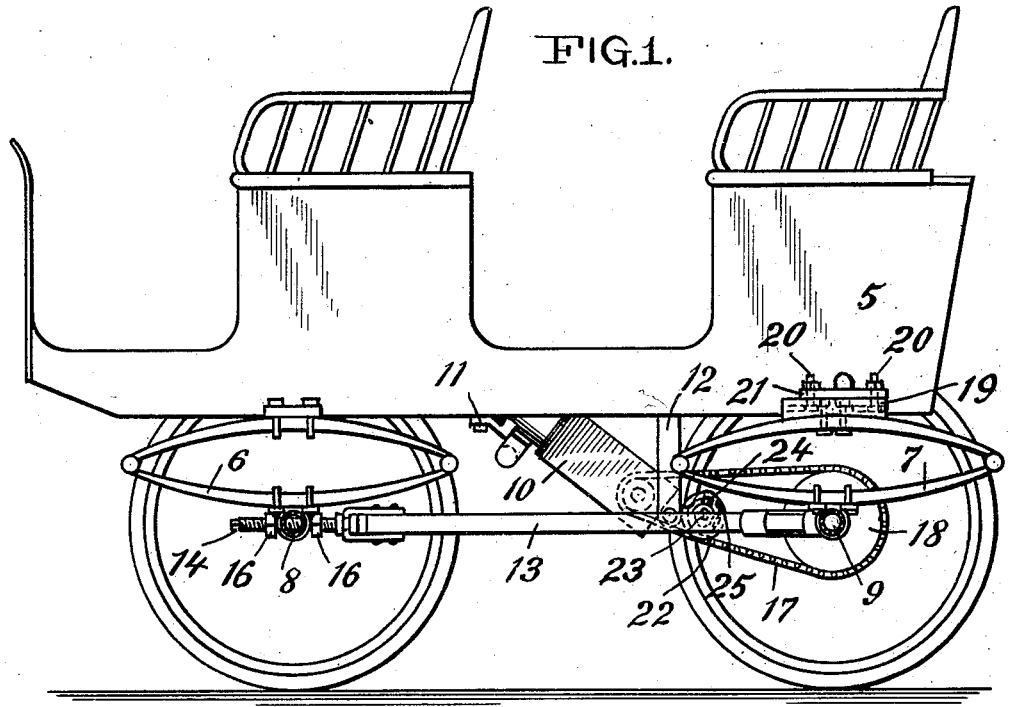
Figure 2:
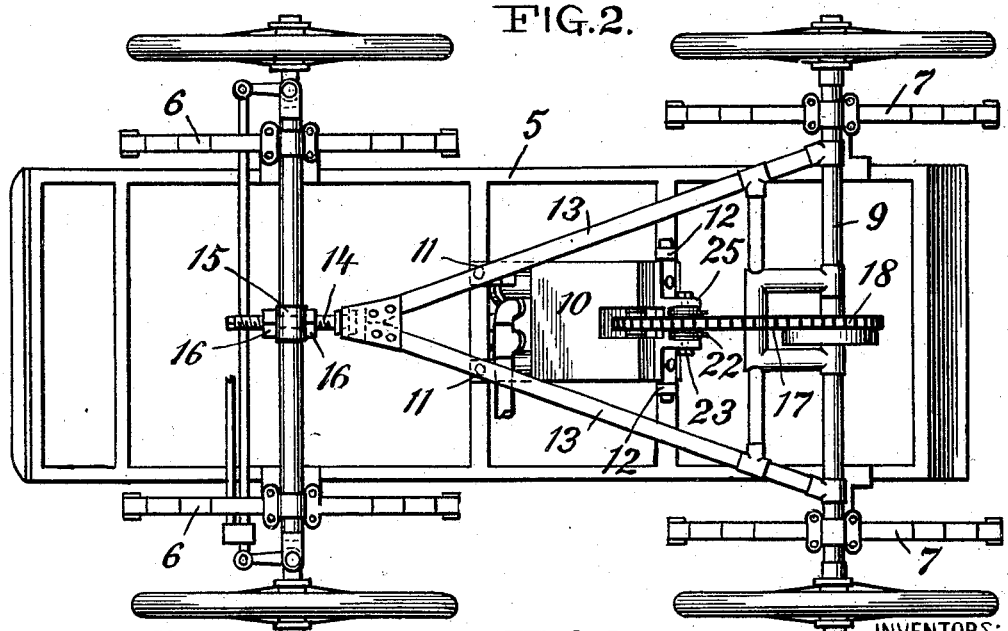
Figure 3:

Figure 1 is a side elevation. Fig. 2 is a plan view of the bottom of the vehicle looking upward. Fig. 3 is an enlarged detail illustrating how the body of the vehicle is carried upon the rear springs.

Similar numerals indicate like parts.

5 indicates the body of the vehicle, supported upon springs 6 7, mounted on the axles 8 9. Depending from the body of the vehicle is a power-motor 10, which is secured rigidly to the body of the vehicle by means of the brackets and bolts 11 and straps 12. The axles 8 and 9 are adjustably connected by means of the V-shaped reach 13. This reach is rigidly connected to the rear axle and adjustably connected to the front axle by means of a screw 14, block 15, and nuts 16. It will be seen that by releasing the nuts 16 the distance between the axles 8 9 can be altered—that is, the distance can be increased when it is desired to take up any considerable amount of slack in the power-transmission chain 17, introduced between the motor and the sprocket 18 on the rear axle.

In order to permit the rear axle 9 and spring 7 to be moved bodily backward relative to the body 5 of the vehicle, we provide a slip-joint between the top of the springs 7 and the body of the vehicle. This joint consists of a slotted plate 19, in which is situated bolts 20, with square heads. On opposite sides of the body of the vehicle is a projecting plate 21, having openings therein to receive the shanks of the bolts 20. On the ends of the bolts 20 are nuts. It will be understood that when the axle 9 is moved backward the bolts 20 move to the left in the slotted plates 19 and can by reason of the nuts be fixed in their new position.

The main adjustment of the chain 17 is, as above stated, effected through the medium of the reach 13. We, however, provide means for a fine adjustment of the chain, which means consists of a wheel 22, mounted upon a shaft 23, which is located in slots 24 in a bearing 25, formed as a projection from the lower part of the motor, as shown in Fig. 2. The wheel 22 bears upon the chain, and means are provided (not shown) for clamping the shaft 23, which supports the wheel 22, in any position in the slot 24, so that the wheel 22 will bear positively upon the top of the chain 17.

We wish it understood that we do not limit ourselves to the precise means shown for increasing the distance between the axles of the machine, and thus taking up the slack of the power-transmission chain. Neither do we limit ourselves to the precise construction of the wheel 22 and its mounting, which bears upon the power-transmission chain and serves as a fine adjustment. Other devices may be employed in place of those shown. Neither do we wish it understood that we are in any wise obliged to use both forms of adjustment, as one may be used without the other.

Having thus described our invention, we claim—

1. In a motor-vehicle, the combination with a vehicle-body, a motor supported on said body, a steering-axle fixed to the body, a driving-axle longitudinally adjustable relative to the body, a power-transmission means between the motor and the driving-axle, and an extensible reach interposed between the axles for altering the distance between them.

2. In a motor-vehicle, the combination with a vehicle-body, a motor supported on said body, a steering-axle fixed to the body, a driving-axle longitudinally adjustable relative to said body, a power-transmission means between the motor and the driving-axle, a device adapted to make tension upon the power-transmission means, and an extensible reach interposed between the axles for varying the distance between them.

3. In a motor-vehicle, the combination with the motor and the driving-axle, a slotted bearing projecting from the lower portion of said motor, a shaft adjustably mounted in said slotted bearing, a wheel mounted on said shaft, and a sprocket-chain between said motor and said driving-axle and bearing on said wheel.

In testimony whereof we affix our signatures in the presence of two witnesses.

WILLIAM JAMES LANE.
   GEORGE LANE.

Witnesses:
 J. E. PEARSON,
 C. E. STECHER.